(12) United States Patent
Valente

(10) Patent No.: US 8,520,738 B2
(45) Date of Patent: Aug. 27, 2013

(54) VIDEO DECODER WITH HYBRID REFERENCE TEXTURE

(75) Inventor: Stephane Valente, Paris (FR)

(73) Assignee: NXP, B.V., Eindhoven (NL)

(*) Notice: Subject to any disclaimer, the term of this patent is extended or adjusted under 35 U.S.C. 154(b) by 1538 days.

(21) Appl. No.: 11/916,321

(22) PCT Filed: May 31, 2006

(86) PCT No.: PCT/IB2006/051732
§ 371 (c)(1),
(2), (4) Date: Dec. 3, 2007

(87) PCT Pub. No.: WO2006/129280
PCT Pub. Date: Dec. 7, 2006

(65) Prior Publication Data
US 2008/0212684 A1 Sep. 4, 2008

(30) Foreign Application Priority Data
Jun. 3, 2005 (EP) .................................. 05300453

(51) Int. Cl.
*H04N 7/12* (2006.01)

(52) U.S. Cl.
USPC ............ 375/240.23; 375/240.12; 375/240.14; 375/240.16

(58) Field of Classification Search
USPC ........................... 375/240.12, 240.14, 240.16
See application file for complete search history.

(56) References Cited

U.S. PATENT DOCUMENTS

| | | | | |
|---|---|---|---|---|
| 5,175,618 A | * | 12/1992 | Ueda et al. | 375/240.13 |
| 5,227,878 A | * | 7/1993 | Puri et al. | 375/240.15 |
| 5,488,419 A | * | 1/1996 | Hui et al. | 375/240.17 |
| 5,565,922 A | * | 10/1996 | Krause | 375/240.14 |
| 5,745,182 A | * | 4/1998 | Yukitake et al. | 375/240.16 |
| 5,767,898 A | * | 6/1998 | Urano et al. | 348/43 |
| 5,933,534 A | * | 8/1999 | Yoshimoto et al. | 382/236 |
| 6,584,156 B1 | | 6/2003 | Gu et al. | |
| 6,633,344 B1 | | 10/2003 | Worrell et al. | |
| 6,697,431 B1 | * | 2/2004 | Yoneyama | 375/240.16 |
| RE38,564 E | | 8/2004 | Eifrig et al. | |

(Continued)

FOREIGN PATENT DOCUMENTS

EP 1 294 194 A1 3/2003

OTHER PUBLICATIONS

Shizhong, Liu; et al "Local Bandwidth Constrained Fast Inverse Motion Compensation for DCT-Domain Video Transcoding" IEEE Transactions on Circuits and Systems for Video Technology, IEEE Service Center, vol. 12, No. 5, May 2002, pp. 309-319.

(Continued)

*Primary Examiner* — Ricky Ngo
*Assistant Examiner* — Dewanda Samuel

(57) ABSTRACT

The present invention relates to a video decoder (DEC) for decoding a bit stream (BS) corresponding to pictures (P) of a video signal, the coded pictures being likely to include macroblocks coded in a progressive and in an interlaced way. The decoder includes a decoding unit (DEU) for decoding macroblocks coded in a progressive way, and a hybrid reference construction unit (HRCU) for constructing, for each reference picture, a hybrid reference texture (HRT) which has the property of representing said reference picture in a frame-based and in a field-based manner. Said hybrid reference texture is used by said decoding unit for decoding interlaced macroblocks.

6 Claims, 3 Drawing Sheets

(56) References Cited

U.S. PATENT DOCUMENTS

| | | | | |
|---|---|---|---|---|
| 6,931,062 | B2* | 8/2005 | Zhong | 375/240.12 |
| 7,839,933 | B2* | 11/2010 | Lin et al. | 375/240.24 |
| 7,924,920 | B2* | 4/2011 | Hsu et al. | 375/240.15 |
| 8,270,480 | B2* | 9/2012 | Yin et al. | 375/240.12 |
| 2004/0120397 | A1* | 6/2004 | Zhang et al. | 375/240.03 |
| 2005/0013498 | A1* | 1/2005 | Srinivasan et al. | 382/239 |
| 2005/0152457 | A1* | 7/2005 | Regunathan et al. | 375/240.25 |
| 2008/0130751 | A1* | 6/2008 | Kobayakawa et al. | 375/240.16 |

OTHER PUBLICATIONS

"MPEG Digital Video-Coding Standards—Delivering Picture-Perfect Compression for Storage, Transmission, and Multimedia Applications" IEEE Signal Processing Magazine, IEEE Service Center, vol. 14, No. 5, Sep. 1997, pp. 82-100.

Nakayama, H; et al "An MPEG-4 Video LSI With an Error-Resilient Codec Core Based on a Fast Motion Estimation Algorithm" Solid-State Circuits Conference, 2002. Digest of Technical Papers. 2002 IEEE International Feb. 3-7, 2002, vol. 1.

Puri, A; et al "Video Coding Using the H.264/MPEG-4 AVC Compression Standard" Signal Processing. Image Communication, Elsevier Science Publishers, Amsterdam, NL, vol. 19, No. 9, Oct. 2004, pp. 793-849.

"Information Technology—Coding of audio-visual objects—Part 2: Visual—Amendment 1: Visual Extensions (Draft of Jan. 6, 2000 for final review)", International Organisation for Standardisation Organisation International Normalisation ISO/IEC JTC 29/WG 11 Coding of Moving Pictures and Audio, 557 pgs, retrieved from the internet at: ftp://ftp.cis.upenn.edu/pub/cg/public_html/ . . . /MPEG4visualV2.pdf (1999).

\* cited by examiner

VIDEO DECODER WITH HYBRID REFERENCE TEXTURE

FIELD OF THE INVENTION

The present invention relates to a video decoder for decoding a bit stream corresponding to pictures of a video signal, the coded pictures being likely to include macroblocks coded in a progressive and in an interlaced way. More particularly, the invention relates to a decoder including a decoding unit for decoding macroblocks coded in a progressive way.

BACKGROUND OF THE INVENTION

As indicated in "Information Technology—Coding of audio-visual objects—Part 2: Visual, Amendment 1: Visual extensions", ISO/IEC 14496-2:1999/Amd. 1:2000, ISO/IEC JTV 1/SC 29/WG 11 N 3056, the MPEG-4 standard defines a syntax for video bit streams which allows interoperability between various encoders and decoders. Standards describe many video tools, but implementing all of them can result in a too high complexity for most applications. To offer more flexibility in the choice of available tools and encoder/decoder complexity, the standard further defines profiles, which are subsets of the syntax limited to particular tools.

For instance, the Simple Profile (SP) is a subset of the entire bit stream syntax which includes in MPEG terminology: I and P VOPs, AC/DC prediction, 1 or 4 motion vectors per macroblock, unrestricted motion vectors and half pixel motion compensation for progressive pictures. The Advanced Simple Profile (ASP) is a superset of the SP syntax: it includes the SP coding tools, and adds B VOPs, global motion compensation, interlaced pictures, quarter pixel motion compensation where interpolation filters are different from the ones used in half-pixel motion compensation, and other tools dedicated to the processing of interlaced pictures.

The document US RE38,564 E discloses a motion estimation and compensation technique for interlaced digital video such as video object planes (VOPs). Predictor motion vectors for use in differentially encoding a current field coded macroblock are obtained using the median of motion vectors of surrounding blocks or macroblocks. When a surrounding macroblock is itself interlaced an average motion vector for that macroblock is used. This document also discloses a decoder that is provided with functions enabling the direct decoding of field coded macroblocks as defined in ASP.

Nevertheless, interlacing modifies two low-level processes: motion compensation and inverse Direct Cosine Transform (DCT in the following). In some devices with limited CPU resources or power resources, it can be advantageous to use hardware accelerated functions to carry on some of the decoding operations, even if the hardware acceleration devices are not capable to perform the decoding operations in a conformant way. This results in decoding errors which are penalizing in the case of interlaced macroblocks in interlaced pictures.

SUMMARY OF THE INVENTION

Accordingly, it is an object of the invention to provide a video decoder that uses a decoding unit for decoding progressive pictures and macroblocks and that avoids penalizing errors concerning the decoding of interlaced pictures.

To this end, there is provided a video decoder including a hybrid reference construction unit for constructing, for each reference picture, a hybrid reference texture which has the property of representing said reference texture in a frame-based and in a field-based manner, said hybrid reference texture being used by said decoding unit for decoding interlaced macroblocks.

It is thus provided a pseudo-ASP decoder that relies on a decoding unit able to process progressive pictures and, in the case of MPEG-4, on MPEG-4 SP acceleration functions.

In an embodiment, said hybrid reference texture includes the reference texture in frame structure as found in the bit stream and a reference texture in field structure obtained by de-interlacing and extracting the two fields.

Advantageously, said hybrid texture is stored in a memory.

In an advantageous implementation, said hybrid reference texture is extended with repetitive pixel padding, the two fields of the reference texture in field structure being extended independently from each other.

In an embodiment, said hybrid reference construction unit is activated on a picture basis when a flag, in a corresponding video object layer header, is set to a value indicating that coded pictures in this video object layer are interlaced.

The invention also relates to a method for decoding a bit stream corresponding to pictures of a video signal, the coded pictures being likely to include macroblocks coded in a progressive and in an interlaced way, said method including a decoding step for decoding macroblocks coded in a progressive way. Said method is characterized in that it includes a hybrid reference construction step for constructing, for each reference picture, a hybrid reference texture HRT which has the property of representing said reference texture in a frame-based and in a field-based manner.

The invention also relates to a computer program product comprising program instructions for implementing, when said program is executed by a processor, a decoding method as disclosed above.

The invention finds application in the playback of video standards as MPEG-4 and DivX streams on mobile phones in which a video encoder as described above is advantageously implemented.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

In the following description, well-known functions or constructions by the person skilled in the art are not described in detail since they would obscure the invention in unnecessary detail.

Figure 1:
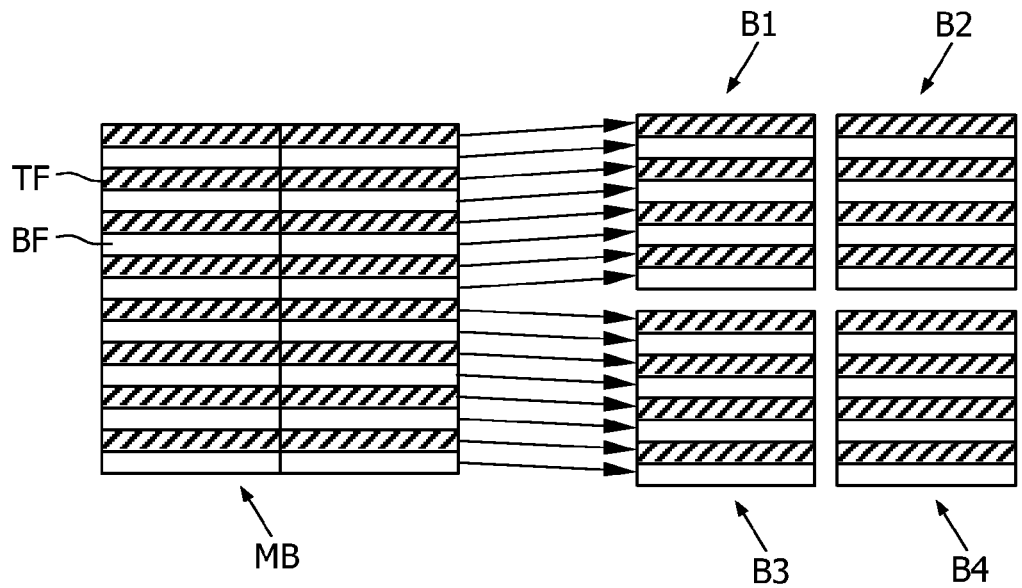
FIG. 1 illustrates a macroblock structure in frame DCT coding.

When interlaced pictures are used in a coding, the inverse DCT can be either a frame DCT or a field DCT as specified by a syntax element called dct_type included in the bit stream for each macroblock with texture information. When the dct_type flag is set to 0 for a particular macroblock, the macroblock is frame coded and the DCT coefficients of luminance data encode 8*8 blocks that are composed of lines from two fields alternatively. This mode is illustrated in FIG. 1. Two fields TF and BF are respectively represented by hatched part and blank part. FIG. 1 illustrates the frame structure of the 8*8 blocks B1, B2, B3, B4 of an interlaced macroblock MB after frame DCT coding.

Figure 2:
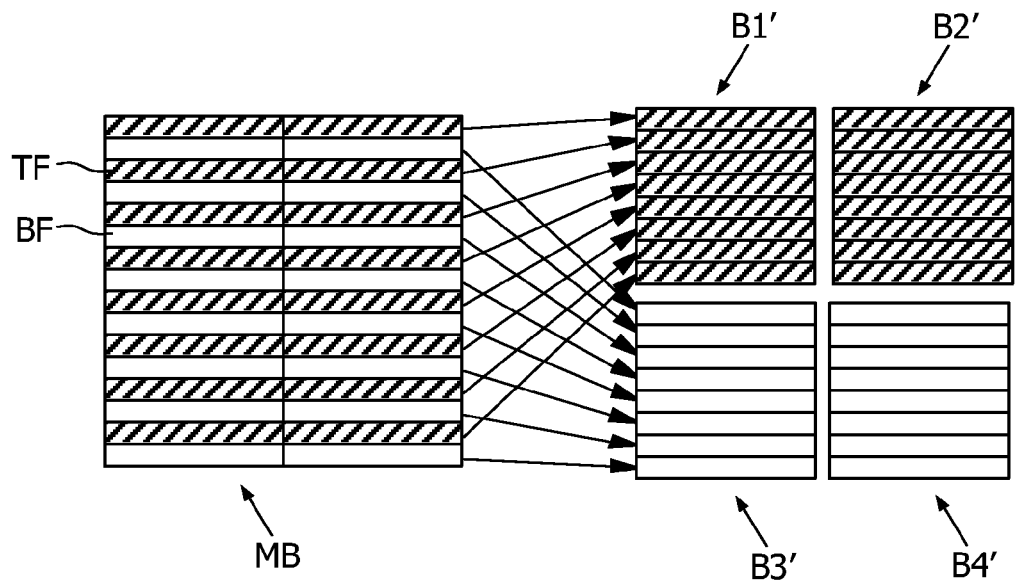
FIG. 2 illustrates a macroblock structure in field DCT coding.

When the dct_type flag is set to 1 for a particular macroblock, the macroblock is field coded and the DCT coefficients of luminance data are formed such that a 8*8 block consists of data from one field only. This mode is illustrated on FIG. 2. FIG. 2 illustrates the frame structure of the 8*8 blocks B1', B2', B3', B4' of an interlaced macroblock MB after field DCT coding. In classical inverse DCT, the luminance blocks B1', B2', B3' and B4' have then to be inverse permuted back to frame macroblocks. It is here reminded that, generally, even if field DCT is selected for a particular macroblock, the chrominance texture is still coded by frame DCT.

The motion compensation can also either be frame-based or field-based for each macroblock. This feature is specified by a syntax element called field_prediction at the macroblock level in P and S-VOPs, for non global motion compensation (GMC) macroblocks. Effectively, it has to be noted that global motion compensation is always frame-based in interlaced pictures.

If the field_prediction flag is set to 0, non-GMC motion compensation is performed just like in the non-interlaced case. This can be done either with a single motion vector applied to 16*16 blocks in mode 1-MV, or with 4 motion vectors applied to 8*8 blocks in mode 4-MV. Chrominance motion vectors are always inferred from the luminance ones. If the field_prediction flag is set to 1, non-GMC blocks are predicted with two motion vectors, one for each field, applied to 16*8 blocks of each field. Like in the field DCT case, the predicted blocks have to be permuted back to frame macroblocks after motion compensation.

Moreover, field based predictions may result in 8*4 predictions for chrominance blocks, by displacement of one chroma line out of two, which correspond to one field only in the 4:2:0 interlaced color format.

During encoding, in non-GMC macroblocks, frame and field DCT and frame and field motion prediction can be applied independently from each other. Table 1 summarizes the different combinations that may arise in I-, P- and S-VOPs (Sprite VOPs) of ASP streams excluding GMC macroblocks.

TABLE 1

| Case number | Name | DCT Type | Motion prediction type |
|---|---|---|---|
| 1 | Intra frame | Frame | none |
| 2 | Intra field | Field | |
| 3 | Inter 1 MV MC/frame DCT | Frame | 16 × 16 frame-based for luminance |
| 4 | Inter 1 MV MC/field DCT | Field | 8 × 8 frame-based for chrominance |
| 5 | Inter 4 MV MC/frame DCT | Frame | 4 8 × 8 frame-based for luminance |
| 6 | Inter 4 MV MC/field DCT | Field | 8 × 8 frame-based for chrominance |
| 7 | Inter field MC/frame DCT | Frame | 2 16 × 8 field-based for luminance |
| 8 | Inter field MC/field DCT | Field | 2 8 × 4 field-based for chrominance |

Figure 3:
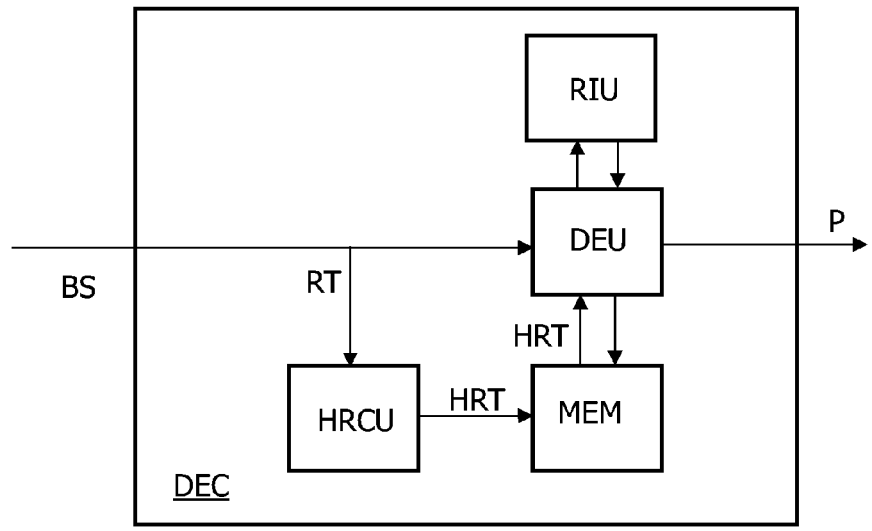
FIG. 3 represents a video decoder according to the invention.

FIG. 3 schematically represents a video decoder DEC for decoding a bit stream BS in pictures P of a video signal. The bit stream is likely to include macroblocks coded in a progressive way and in an interlaced way. The decoder DEC includes a decoding unit DEU for decoding macroblocks coded in a progressive way. It is the case for MPEG-4 Simple Profile decoding functions that can only reconstruct frame-based 8*8 inverse DCT and motion compensate 16*16 or 8*8 frame-based blocks for the luminance channel and 8*8 blocks for the chrominance ones. Therefore said decoding unit DEU can only directly handle the decoding in a frame-based structure of macroblock types 1, 3 and 5 in Table 1.

For macroblocks types 2, 4 and 8 (Table 1), some field-based DCT has to be applied on the reconstructed picture. This kind of inverse DCT, when decoded by an MPEG-4 simple profile decoding in a frame-based structure, results in decoded blocks of 8*8 pixels belonging to a single field, just like on the right hand side of FIG. 1b. The top 8*8 blocks correspond to the top field and the bottom 8*8 blocks to the bottom field.

Macroblocks of type 2 can be decoded this way by the decoding unit DEU and could then be re-interlaced by a re-interlacing unit RIU to obtain the final interlaced structure of the decoded macroblock as illustrated on the left hand side of FIG. 2. This technique cannot directly be applied for macroblocks of types 4 and 8. In fact, it would need to add the 8*8 field-based DCT pixels to 8*8 blocks of motion prediction having the same "one field only" structure (as illustrated on the right side of FIG. 2), but said decoding unit DEU cannot form such a "one field only" motion-prediction because it can only displace 8*8 blocks of pixels in a frame-based manner from a reference texture.

Figure 4:
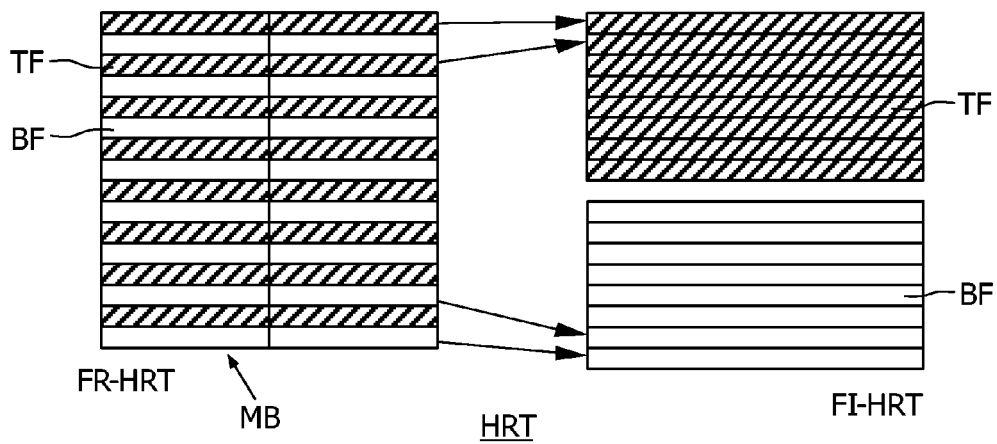
FIG. 4 illustrates the construction of a hybrid reference texture according to the invention, FIG. 5 gives an example of an advantageous implementation for the construction of a hybrid reference texture.

Thus for decoding macroblocks of type 4 and 8, the decoder DEC includes a hybrid reference construction unit HRCU for calculating a hybrid reference texture HRT from each reference texture RT. Such a hybrid reference texture HRT is represented in FIG. 4, the hybrid reference texture HRT has the property of representing a reference texture both in a frame-based manner FR-HRT, with interlaced fields as represented on the left side of FIG. 4, and in a field-based manner FI-HRT, each field TF and BF being accessible independently from the other one as represented on right side of FIG. 4. Said hybrid reference texture HRT, constituted of the reference texture in frame structure FR-HRT and of the reference texture in field structure FI-HRT is stored in a memory MEM and is addressable by said decoding unit DEU.

Therefore, said decoding unit DEU can form motion prediction with pixels coming from both fields TF and BF of from one field only, still by displacing 8*8 blocks of pixels in a frame-based manner. Practically, said hybrid reference construction unit HRCU de-interlaces the luminance component of the reference texture in a frame-based manner FR-HRT in order to extract its two separate fields TF and BF. Once split, the two fields TF and BF are placed in a reference texture memory MEM, next to the original frame representation FR-HRT and forming said reference texture in field structure FI-HRT.

The invention enables to process macroblocks of type 4 and 8. Effectively, using this hybrid reference texture HRT, it becomes possible to reconstruct the luminance prediction of a macroblock either in the frame or in field mode as explained hereinafter.

Considering the value of the field_prediction flag, the motion vector will be considered by said decoding unit DEU as pointing on the left hand or on the right hand side of said reference texture HRT.

By passing an 8*8 motion vector that points to the left hand side of the reference texture FR-HRT, the decoding unit DEU forms an 8*8 motion prediction that comprises the two fields TF and BF. This mode is suitable for instance for macroblocks of type 3 and 5, where the decoding unit DEU can also directly add an 8*8 frame-based inverse DCT to reconstruct the picture. By passing an 8*8 motion vector that points to the right hand side of the reference texture FI-HRT, the decoding unit DEU forms an 8*8 motion prediction from one field only. This last mode is suitable for macroblocks of type 4 and 8.

Effectively, for macroblocks of type 4, each 16*16 frame-based decoded motion vector is translated into four 8*8 motion vectors pointing to the reference texture in field structure FI-HRT. The motion prediction will thus consist of two 8*8 blocks containing predictions for the odd field and two other 8*8 blocks for the even field. Since the DCT coefficients for macroblocks of type 4 encode pixels coming also from one field only, the decoding unit DEU can directly add the 8*8 inverse DCT of field-based pixels to the 8*8 motion predictions that contain pixels relevant from one odd or even field only, without any field structure mismatch.

Similarly, for macroblocks of type 8, the top and bottom field-based motion vectors decoded from the bitstream are translated to point to the field representation FI-HRT. The "one field only" motion predictions for the luminance channel can also directly be added to the "one field only" 8*8 inverse DCTs. After re-interlacing of the decoded macroblocks in both cases in a re-interlacing unit RIU connected to said decoding unit DEU, the correct frame-based reconstruction is obtained.

For macroblocks of type 7, the same hybrid reference texture HRT can also be used by the decoding unit DEU to form the motion prediction, but, this time, without directly adding the frame-based inverse DCT that simultaneously encodes residual pixels for both fields. Effectively, the motion prediction has to be re-interlaced by the re-interlacing unit RIU to a frame-based structure before applying the residual DCT texture in said decoding unit DEU.

Figure 5:
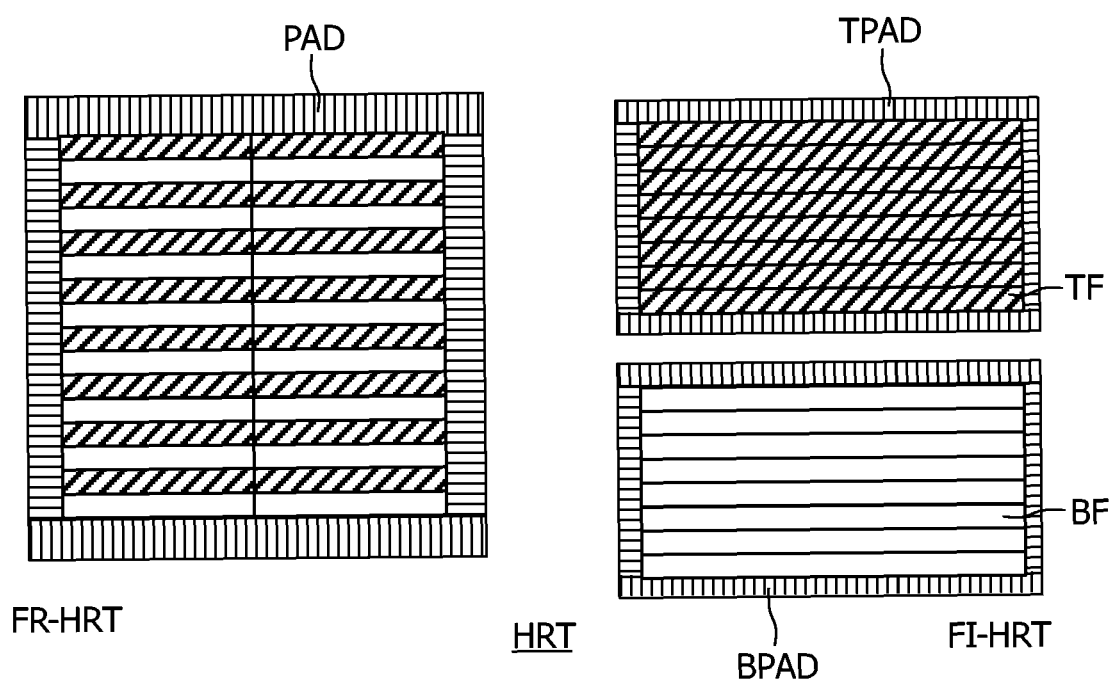

In a preferred embodiment, as illustrated in FIG. 5, each region of the hybrid reference texture HRT is extended with repetitive pixel padding PAD. Thus, the frame-based reference texture FR-HRT is extended by 16 pixels in each direction, constituting the padding PAD. The field-based reference texture is extended by 8 pixels in each direction, independently for each field TF and BF of the field-based hybrid reference texture FI-HRT, as illustrated in FIG. 5. Two repetitive pixel padding TPAD and BPAD are respectively obtained for each of the two fields TF and BF.

The padding process is as follows: each sample at the boundary of a region is replicated horizontally to the left and right direction in order to fill the extended area around the field-based or frame-based representation. Then, the remaining unfilled pixels in the extended regions are padded by a similar process, but in the vertical direction. This padding in extended regions is designed to support the "unrestricted motion compensation" MPEG-4 tool, which allows motion vectors to point outside of the reference texture HRT area. In this case, motion prediction uses pixels replicated from the closest boundary. Clipping the motion vectors passed in the decoding unit DEU so that they do not point beyond the extended areas of each frame-based or field-based region achieves the correct motion prediction.

The invention is particularly interesting for processing of video signals on mobile devices like mobile phones. MPEG-4 or DivX streams can thus be processed by reusing an SP decoding unit to decode ASP streams.

It is to be understood that the present invention is not limited to the aforementioned embodiments and variations and modifications may be made without departing from the spirit and scope of the invention as defined in the appended claims. In the respect, the following closing remarks are made.

There are numerous ways of implementing functions of the method according to the invention by means of items of hardware or software, or both, provided that a single item of hardware or software can carries out several functions. It does not exclude that an assembly of items of hardware or software or both carry out a function, thus forming a single function without modifying the method of processing the drift frequency in accordance with the invention.

Said hardware or software items can be implemented in several manners, such as by means of wired electronic circuits or by means of an integrated circuit that is suitable programmed respectively.

Any reference sign in the following claims should not be construed as limiting the claim. It will be obvious that the use of the verb "to include" and its conjugations do not exclude the presence of any other steps or elements besides those defined in any claim. The article "a" or "an" preceding an element or step does not exclude the presence of a plurality of such elements or steps.

The invention claimed is:

1. A video decoder for decoding a bit stream corresponding to pictures of a video signal, the coded pictures being likely to include macroblocks coded in a progressive and in an interlaced way, said decoder comprising a decoding unit for decoding macroblocks coded in a progressive way, characterized in that said video decoder includes a hybrid reference construction unit for constructing, for each reference picture, a hybrid reference texture which has the property of representing said reference picture in a frame-based and in a field-based manner, said hybrid reference texture being used by said decoding unit for decoding interlaced macroblocks, wherein said hybrid reference texture includes the reference texture in frame structure as found in the bit stream and a reference texture in field structure obtained by de-interlacing and extracting the two fields in the reference picture, wherein said hybrid reference construction unit is activated on a picture basis when a flag, decoded or inferred from the bitstream, is set to a value indicating which coded pictures are interlaced.

2. A video decoder as claimed in claim 1 wherein said hybrid reference texture is stored in a memory.

3. A video decoder as claimed in claim 1, wherein said hybrid reference texture is extended with repetitive pixel padding, the two fields of the reference texture in field structure being extended independently from each other.

4. A method of decoding a bit stream in pictures of a video signal, coded pictures being likely to include macroblocks coded in a progressive and in an interlaced way, said method comprising a decoding step for decoding macroblocks coded in a progressive way, characterized in that said method includes a hybrid reference construction step for constructing, for each reference picture, a hybrid reference texture which has the property of representing said reference picture in a frame-based and in a field-based manner, said hybrid reference texture being used in said decoding step for decoding interlaced macroblocks, wherein said hybrid reference texture includes the reference texture in frame structure as found in the bit stream and a reference texture in field structure obtained by de-interlacing and extracting the two fields in the reference picture, and wherein said hybrid reference construction step is activated on a picture basis when a flag, decoded or inferred from the bitstream, is set to a value indicating which coded pictures are interlaced.

5. A non-transitory computer program product comprising program instructions for implementing, when said program is executed by a processor, a decoding method as claimed in claim 4.

6. A mobile device including a video decoder as claimed in claim 1.

* * * * *